United States Patent Office 3,074,055
Patented Jan. 15, 1963

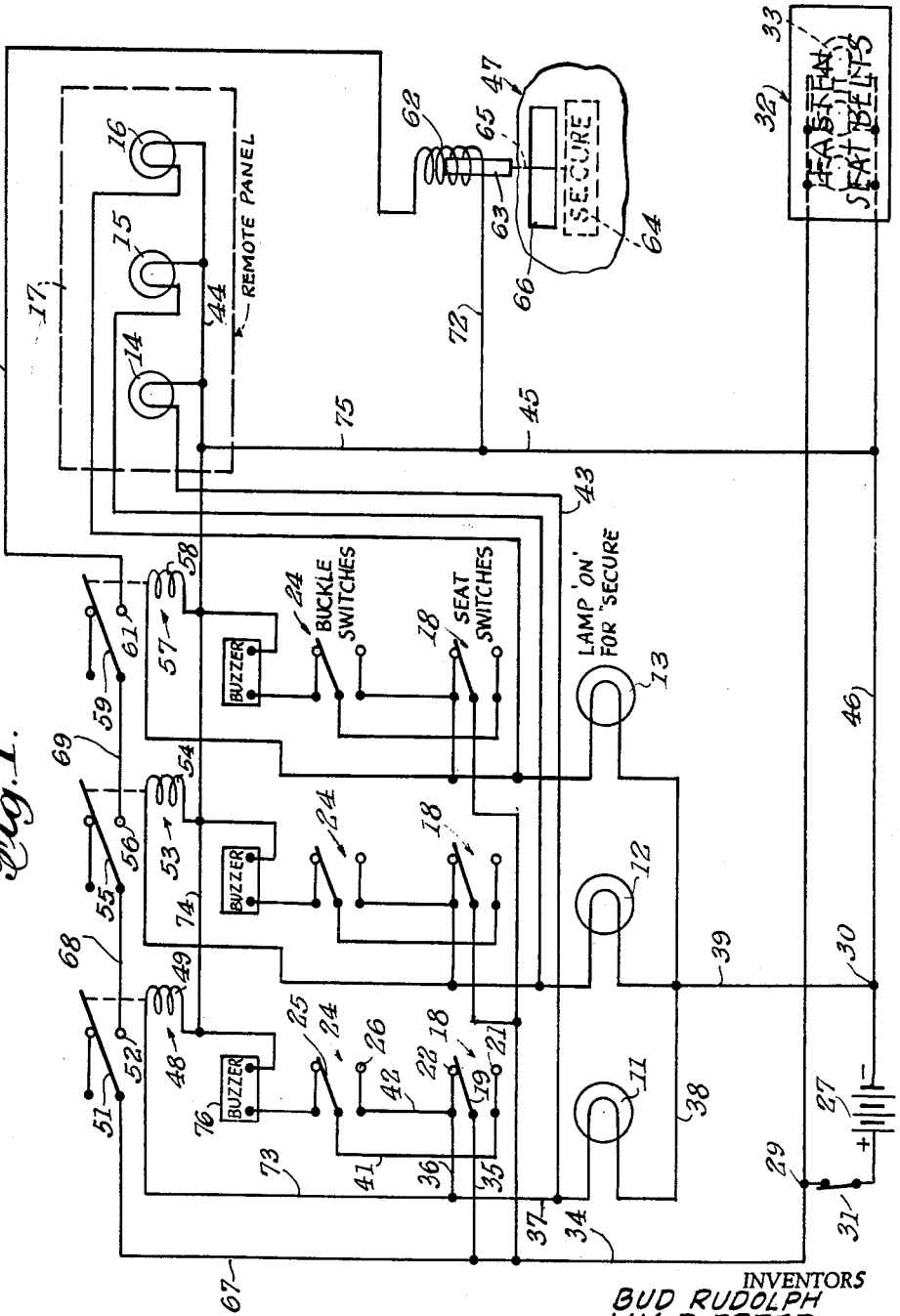

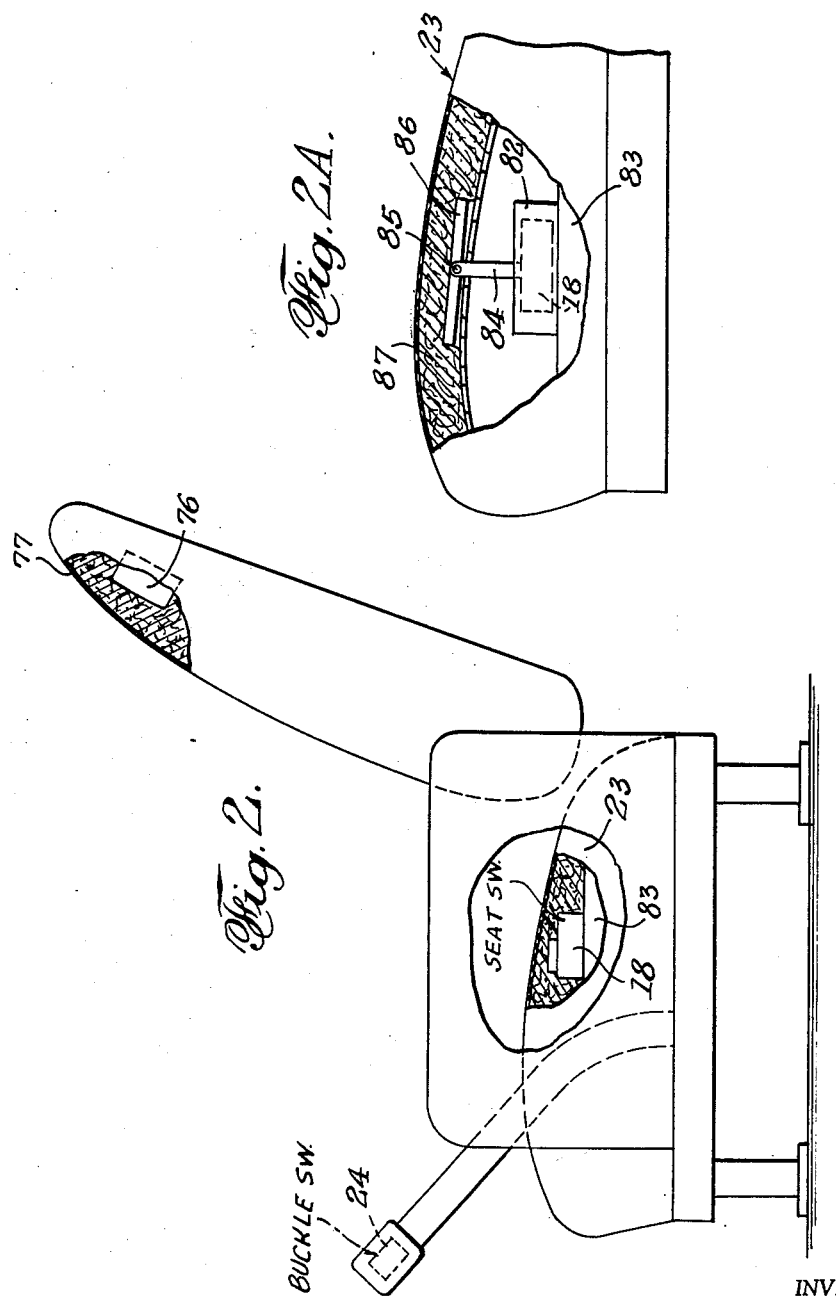

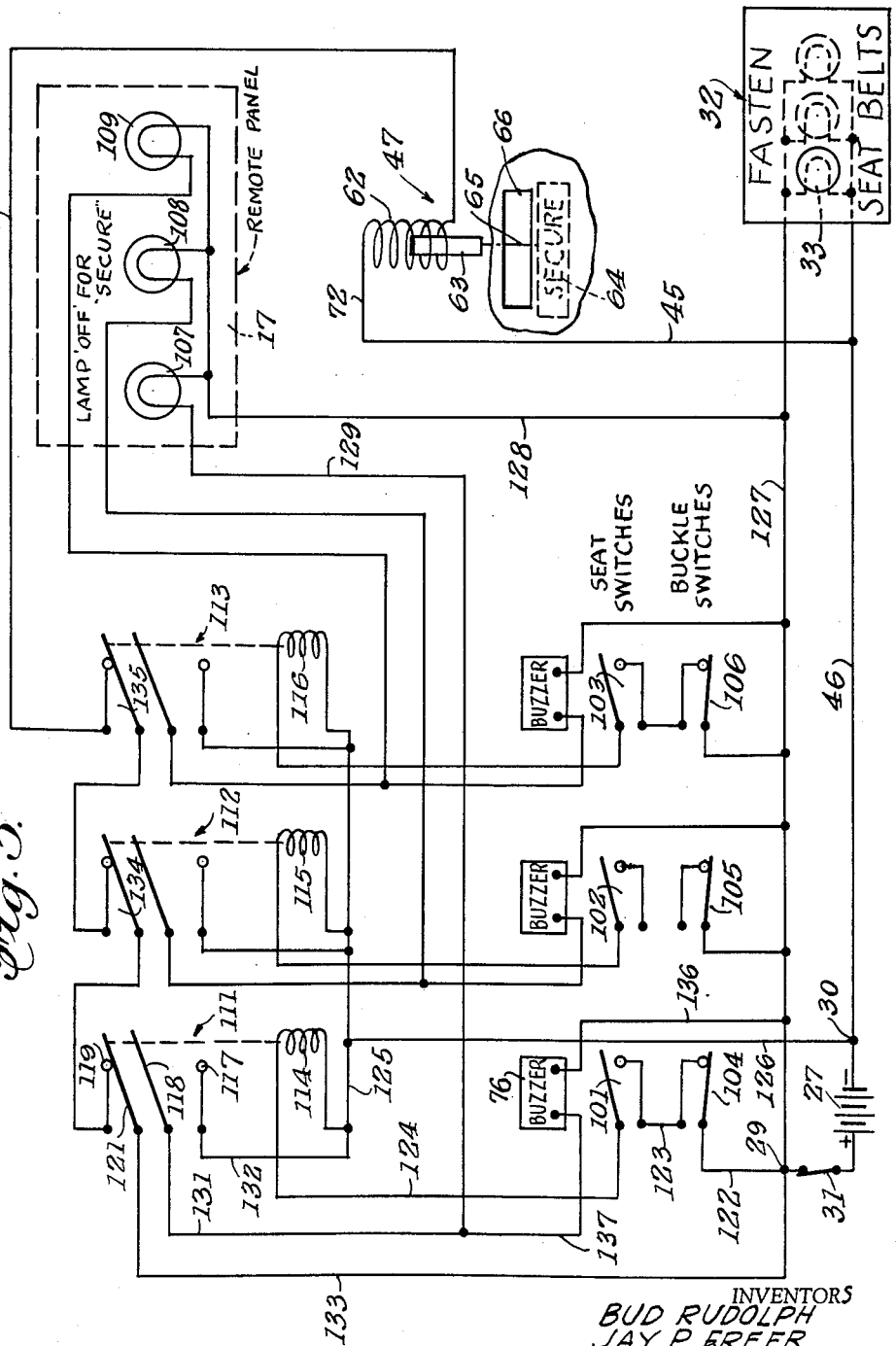

3,074,055
PASSENGER SAFETY INDICATING SYSTEMS
Bud Rudolph, Beverly Hills, and Jay P. Freer, Redondo Beach, Calif., assignors to Saftronics, Inc., a corporation of California
Filed Apr. 20, 1959, Ser. No. 807,393
8 Claims. (Cl. 340—278)

This invention relates to passenger safety indicating systems, and has for its principal object to enable vehicles such as aircraft, passenger busses, school busses, and the like to be operated with assurance to the operating personnel that all occupants of seats are securely fastened in their seats in order to minimize injuries which may occur in the event of mishaps, overturning or crash.

It is well known that seat belts are provided in passenger airplanes for use whenever uneven or rough weather is expected in order to guard against injuries which may occur to passengers in the event of sudden dropping of the airplane due to down drafts or mishaps in landing or taking off. In airplanes, such seat belts are ordinarily not required to be fastened unless a warning signal has been given by the pilot. It is an object of the invention, therefore, to provide a passenger safety indicating system which may be coordinated with the seat belt warning indicator so that the system will be in operation whenever the seat belt warning lights or other indication is in operation.

Seat belts have also been recommended for passenger vehicles and are especially desirable in the case of passenger busses and school busses. It is an object of the invention in connection with such land vehicles to provide a passenger safety indicating system which may be coordinated with the operation of the engine, for example, the ignition switch so that the driver will be able to determine before he sets the vehicle in motion whether all passengers have their seat belts fastened.

A more specific object of the invention is to indicate when seat belts of occupied seats are fastened.

Another object of the invention is to provide indication at the seat or at a remote panel, for example, at the station of the stewardess of an aircraft, or the conductor or operator of a bus, as to the securement of passengers in their seats.

A further object of the invention is to indicate which seat belts of occupied seats are fastened or which ones need to be fastened.

A further object of the invention is to provide a totalizer device to give a single indication, for example, in the pilot's compartment of an aircraft or on the instrument panel of a motor bus to show when all passengers are secured in their seats.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts which will more fully appear in the course of the following description. However, the drawing merely shows and the following description merely describes several embodiments of the present invention, which are given by way of illustration or example only.

In the drawing, like reference characters designate similar parts in the several views.

FIG. 1 is a circuit diagram of an embodiment of the invention providing a system intended particularly to indicate by positive indication such as the illumination of a lamp which occupied seats have their seat belts fastened.

FIG. 2 is a fragmentary schematic diagram representing a passenger seat and showing diagrammatically the location of seat occupancy responsive switches, belt fastening responsive switches, and, if desired, individual warning indicators for advising a passenger when his seat belt must be fastened.

FIG. 2A is a schematic diagram representing the arrangement of the seat switch in the apparatus of FIG. 2.

FIG. 3 is a circuit diagram of a passenger safety indicating system in accordance with the invention in which a positive indication such as the illumination of a lamp takes place at or for occupied seats where the passenger must be advised to fasten his seat belt.

In carrying out the invention in accordance with a preferred form thereof, in a vehicle having a plurality of seats and a seat belt for each seat, an electro-responsive indicator such as a lamp, telltale, or buzzer is provided for each such seat. Each seat is provided with a seat switch mounted in a suitable manner, for example, in the upholstery of the seat so as to be actuated by the weight of the passenger when the seat is occupied. Likewise, each seat belt is provided with a switch which is actuated when the seat belt is fastened. For example, a switch may be employed which is mounted in the buckle of the seat belt so as to respond only when the buckle is closed against the pressure of an inserted belt. A suitable current source is provided with electrical connections to the electro-responsive indicators and the switches with separate circuits for each electro-responsive indicator, and each circuit under the control of both a seat switch and a belt switch corresponding to a seat to which the electro-responsive indicator is intended to give a safety indication. The seat switches are so arranged as to leave the circuits in the safe indicating position when the seat is unoccupied and the belt switches are so arranged as to provide an indication of security when the seat belt is properly fastened, but provide an indication of lack of security when the seat belt is not properly fastened in an occupied seat, having no effect when the seat is not occupied. A plurality of indicators are provided, one for each seat of the vehicle.

The indicators may take the form, for example, of lamps 11, 12 and 13 intended to become bright when the corresponding seat is either unoccupied or, if occupied, has the seat belt fastened. To simplify the drawing, only three such lamps have been illustrated. It will be understood, however, that the number of lamps will correspond to the number of seats. In the specific embodiment of FIG. 1, one such lamp 11, 12 or 13 is mounted upon or adjacent each seat in order to indicate to the stewardess or other attendant conveniently the exact location of occupied seats where the seat belt is properly fastened. If desired, corresponding lamps 14, 15 and 16 or other electro-responsive indicators may also be mounted in a remote panel 17 located at the attendant's station in order that the attendant may obtain the desired information without leaving the attendant's station in the event of rough weather or the like making it undesirable for the attendant to leave the attendant's station except in case of great emergency. Alternatively, the remote panel lamps 14, 15 and 16 may be provided instead of the seat located lamps 11, 12 and 13, if desired.

For each lamp, such as the lamp 11 or 14, there is a seat switch 18 of the single pole double throw type having a movable contact 19, a normally-open stationary contact 21, and a normally-closed stationary contact 22. The seat switch 18 is so mounted in a seat 23 as will be described in greater detail hereinafter in connection with FIG. 2 as to cause the movable contact 19 to move from the position 22 to the position 21 when the seat is occupied.

For each electro-responsive device such as the lamp 11 or 14 there is also a normally-open belt switch or buckle switch 24 having a movable contact 25 and a stationary contact 26.

For energizing the system there is a suitable source of electrical current 27 which may be the generator of an aircraft or the starting battery of a motor bus, for example. Power supply terminals 29 and 30 are provided which are adapted to be connected to the current source 27. Preferably, an energizing switch 31 is interposed between one of the power supply terminals and one of the terminals of the power source 27, for example, between the terminal 29 and the positive terminal of the current source 27.

A passenger warning device 32 is ordinarily provided on airplanes for warning the passengers in addition to an announcement on the public address system when the seat belts are to be fastened. Such a "Fasten Seat Belt" indicator 32 may take the form of an illuminated sign, for example, having lamps 33 hidden behind a panel bearing the translucent letters "Fasten Seat Belts" so that the pilot or other person may energize the passenger warning device 32 when he desires to give the signal to passengers to fasten their seat belts. Preferably, a "Fasten Seat Belt" warning device such as the device 32 is employed in conjunction with the passenger safety indicating system of the present invention, and may be connected to the terminals 29 and 30 of the safety indicating system so as to be energized simultaneously with the energization of the passenger safety indicating system by closure of the energizing switch 31.

When the system energizing switch 31 is closed, a circuit is formed from the positive terminal of the current supply source 27 through the energizing switch 31, the power input terminal 29, a conductor 34, a branch conductor 35, the movable contact 19 of the seat switch 18, the stationary contact 22 (the seat being unoccupied), a branch conductor 36, a conductor 37, the lamp 11, a conductor 38, a conductor 39, back to the second power input terminal 30, and the negative terminal of the current source 27. Accordingly, when the seat corresponding to the lamp 11 is unoccupied, regardless of the condition of the corresponding seat belt or buckle, the lamp 11 is illuminated showing the attendant that no attention need be given to this because in this case it is unoccupied.

However, if the seat should become occupied, the movable contact 19 is shifted from contact with the stationary contact 22 to contact with the stationary contact 21. This breaks the circuit through the lamp 11 extinguishing it and providing an indication to the attendant that the seat belt in this seat needs to be fastened. Upon the fastening of the seat belt, the movable contact 25 of the belt switch 24 closes upon the stationary contact 26. A circuit is then formed from the positive terminal of the current source 27 through the actuating switch 31, the terminal 29, the conductor 34, the conductor 35, movable contact 19, stationary contact 21, a conductor 41, movable contact 25 of the seat switch 24, stationary contact 26, a conductor 42, the conductors 36 and 37 to the lamp 11 and conductors 38 and 39 to the other power input terminal 30 and the negative terminal of the current source 27. In this case also, the lamp 11 is illuminated indicating to the attendant that the passenger at the corresponding seat is secured.

The corresponding lamp 14 in the remote panel 17 is energized and de-energized at the same time as the lamp 11 since it is connected in parallel therewith. The parallel circuit consists of the conductor 43 from the conductor 37, the lamp 14, a conductor 44, a conductor 45, and a conductor 46, back to the power supply terminal 30 which is connected to the other side of the lamp 11 through the conductors 38 and 39.

Similar circuits may be traced for the lamps 12 and 13 or 15 and 16; since these circuits are similar and the corresponding switches are similarly arranged, these circuits need not be traced in detail.

As already explained, the electro-responsive devices or lamps 11, 12 and 13 may be used either with or without remote panel indication.

The system may also be used with or without totalization. If totalization is desired for enabling the airplane pilot, for example, to obtain a single indication when all of the seat belts of occupied seats are properly fastened, a totalizer or electro-responsive indicator device 47 is provided, and relays are provided, one to correspond to each of the lamps 11, 12 and 13. In the arrangement illustrated, there is a relay 48 with a winding 49 connected in parallel with the lamp 11 and a pair of normally-open contacts 51 and 52. Corresponding to the lamp 12 there is a relay 53 with a winding 54 paralleling the lamp 12 a normally-open movable contact 55 and a stationary contact 56. Likewise, there is a relay 57 having a winding 58 in parallel with the lamp 13 having a normally-open movable contact 59 and a stationary contact 61.

The totalizer device 47 may take any desired form having an electric actuating coil 62. In the particular arrangement illustrated diagrammatically in the drawings, the totalizer device 47 employs a solenoid coil 62 cooperating with a magnetic plunger 63 to which a signal or target 64 is connected by a stem 65. The signal or target 64 is normally obscured behind a plate having a window 66 so that when the solenoid 62 is energized, the plunger 63 is lifted and lifts the target 64 into the window space 66 so that the pilot or other person responsible for safety of passengers on board observes the "secure" sign when all occupied seats have their seat belts fastened. A circuit for the solenoid winding 62 of the totalizer device 47 may be traced from the positive terminal of the current source 27 through the safety system energizing switch 31, the power supply input terminal 29, conductor 34, conductor 67, a normally-open movable contact 51 of the relay 48, the stationary contact 52, a conductor 68, contacts 55 and 56 of the relay 53, a conductor 69, the contacts 59 and 61 of the relay 57, a conductor 71 through the solenoid winding 62, a conductor 72, and conductors 45 and 46 back to the power supply input terminal 30, and the negative terminal of the current source 27. It will be understood that this circuit takes place only when all of the relay coils 49, 54, and 58 are energized so as to close the contacts 51, 52, 55, 56 and 59, 61, which occurs when all of the lamps 11, 12 and 13 are illuminated, since the coils 49, 54 and 58 are then connected in parallel with the lamps 11, 12 and 13, respectively. For example, when the seat corresponding to lamp 11 is not occupied so that the condition at that seat is safe, the seat switch 18 remains closed, and there is a circuit from the power supply input terminal 29 through the conductors 34 and 35, contacts 19 and 22, conductor 36, conductor 73, relay winding 49, conductor 74, conductor 75, and conductors 45 and 46 back to the other power supply input terminal 30. On the other hand, when the seat corresponding to the lamp 11 is occupied so as to shift the movable contact 19 of the seat switch 18 and the seat belt is fastened so as to close the seat belt switch 24, the circuit to the relay winding 49 is as follows: from the power supply input terminal 29 through conductors 34, 35, switch contacts 19 and 21, conductor 41, belt switch contact 25, belt switch contact 26, conductors 42 and 36 and 73, relay winding 49 and conductors 74, 75, 45, and 46 as before back to the other power supply input terminal 30. Similar circuits which need not be traced in detail are also provided through the windings 54 and 58 when the seat corresponding to either of these windings is either unoccupied or is occupied but has the seat belt fastened.

It will be observed that the system represented by the embodiment of FIG. 1 provides what is known as "fail safe" operation. Thus, in the event of failure of the current source 27 or the conductor harness connecting the power supply input terminals 29 and 30 to the lamps and the totalizer device 47, the lamps cannot light, and the totalizer device 47 cannot move its targets 64 into the window 66 so as to give any false indications of passenger safety or security.

The invention is not limited to the specific arrangement already described, however, and for certain purposes, it may be desirable to provide devices which are energized when the conditions are unsafe or a passenger is not properly secured instead of vice versa. For example, if desired, individual warning indicators for a particular passenger who has failed to fasten his seat belt when the "Fasten Seat Belt" sign 32 has been energized by closing the switch 31, may be provided. Such an individual warning device may take the form, for instance, of a buzzer 76 mounted within the upholstery at the upper end of the back rest of the seat 23, as shown diagrammatically in FIG. 2 or at the portion of the back rest of the seat constituting a head rest 77. The buzzer may be so designed as to be loud enough to awaken any passenger who has failed to fasten his seat belt without disturbing other passengers. Suitable connections to seat switches and seat belt switches are provided for energizing a buzzer 76 when the seat is occupied but the seat belt is not fastened. For example, in the system of FIG. 1 for energizing the buzzer 76 when the lamp 11 goes out to indicate that a passenger is not properly secured, a back contact 78 may be provided on the seat belt switch 24 against which the movable contact 25 rests when the seat belt is not fastened, but the seat is occupied. A circuit is then formed from the positive terminal of the current source 27, the system energizing switch 31, positive input terminal 29, conductors 34 and 35, seat switch contacts 19 and 21, conductor 41, movable contact 25 of the seat belt switch, stationary back contact 78, a conductor 79, the buzzer 76, a conductor 81, and conductors 74, 75, 45 and 46, back to the power supply input terminal 30 and the negative terminal of the current source 27. However, if the seat is not occupied, the seat switch 18 remains in the position illustrated and the circuit through the buzzer 76 is broken between contacts 19 and 21 and the buzzer 76 is not energized. It will be understood that for use on aircraft, motor busses and other vehicles where gasoline fumes may be present in the event of mishap, the buzzer 76 is encased in an explosion-proof type of covering.

Likewise, although the invention is not limited to the use of a particular type of seat switch or seat belt switch, these switches are preferably of the type enclosed in explosion-proof casings, for example, micro switches having movable metallic diaphragms through which an actuating bar or member acts to move the movable contact of the switch. It will be understood that the switches 18 and 24, as shown in FIG. 2, are only in diagrammatic form and that encased switches would be employed in practice. For example, as illustrated in FIG. 2A, for the seat switch 18 there may be an explosion-proof casing 82 secured to the stationary framework 83 of the seat 23 with an actuating bar 84 pivotally fastened at the upper end by means of a pin 85 or the like to a plate 86 secured under the upper layer 87 of the seat upholstery so that as a passenger seats himself upon the upper layer 87 of the upholstery, the sagging thereof against the seat springs (not shown) resulting from the weight of the passenger presses the actuating bar 84 downward so as to move the seat switch within the casing 82 from the unoccupied to the occupied position thereof. One form of seat belt or buckle switch which may be employed when back contacts are not required for buzzer operation, is illustrated in the co-pending application of Bud Rudolph, Serial No. 749,691, filed July 21, 1958, in which there is an external pressure transmitting device for closing the buckle contacts, and the pressure transmitting device is mounted in the portion of the buckle through which the belt must be passed so that when the buckle is fastened to secure the seat belt, the belt presses against the switch actuating member to close the contacts but mere movement of the buckle handle without the insertion of the seat belt has no effect upon the seat belt or buckle contacts.

A modification of the system of FIG. 1 is disclosed in FIG. 3 which is arranged so as to provide remote indications as well as local indications at each seat whenever the seat belt of an occupied seat is not fastened and to show also the location of such unfastened seat belt. In the arrangement of FIG. 3, single throw switches are employed for both the seat switches and the buckle switches. A system for three seats is illustrated for simplicity in the drawing, but it will be understood that it may be utilized for any number of seats by increasing the number of circuits and seat elements illustrated. As shown there are normally-open seat switches 101, 102, and 103 and normally-closed seat belt or buckle switches 104, 105, and 106. As in the arrangement of FIG. 1 lamps or other electro-responsive visual indicating devices may be provided at each seat, but for simplicity only the electro-responsive devices in the remote panel 17 are illustrated in FIG. 3. These may take the form, if desired, of lamps 107, 108, and 109. These may be connected directly in the circuits of the switches 101 to 106. In the embodiment of FIG. 3, however, although the electro-responsive devices 107, 108, and 109 are operatively connected to the current source 27, under control of the switches 101 to 106, they are not connected directly but through the intermediary of relays 111, 112 and 113. The relay 111 has a winding 114 in the control circuit of seat switch 101 and seat belt switch 104. Similarly, the relay 112 has a winding 115 under control of switches 102 and 105, and the relay 113 has a winding 116 under control of the switches 103 and 106. Each relay has a pair of normally-open contacts and a pair of normally-closed contacts. In the case of relay 113 there is a stationary contact 117 cooperating with a normally-open movable contact 118, and there is a stationary contact 119 cooperating with a normally-closed movable contact 121.

For the seat the condition of which is indicated by the lamp 107, the operation is as follows: after the system energizing switch 31 has been closed to illuminate the "Fasten Seat Belt" sign 32, if the seat is unoccupied, nothing further happens because the seat switch 101 remains open. The lamp 107 remains dark to indicate that no attention need be given to this seat. However, should the seat be occupied, the switch 101 is closed. Should the seat belt remain unfastened, the switch 104 which is a normally-closed switch remains closed and a circuit is formed from the positive terminal of the current source 27 through the system energizing switch 31, the power supply input terminal 29, the closed contacts of switch 104, the contacts of switch 101 which are now closed, conductors 122, 123, 124, the winding 115, conductor 125, and conductor 126 back to the power supply terminal 30 and the negative terminal of the current source 27. This energizes the relay winding 114 causing contacts 117 and 118 to close and contacts 119 and 121 to open. As a result, a circuit is formed from the positive terminal of the current source 27 through the system energizing switch 31, the input terminal 29, conductor 127, conductor 128, the lamp 107, conductor 129, conductor 131, movable contact 118, stationary contact 117, conductor 132, and conductors 125 and 126, back to the power supply input terminal 30 and the negative terminal of the current source 27. Accordingly, the lamp 107 is lighted to show that the seat belt needs to be fastened in the seat corresponding to that lamp. Likewise, the circuit is broken through the winding 62 of the totalizer device 47, causing the target 64 to drop into obscurity away from the window 66, warning the pilot that not all occupied seats have their seat belts fastened.

As soon as the seat belt is fastened, the seat belt switch 104 opens and the circuit to the winding 114 is broken causing the contacts 117 and 118 to separate and extinguishing the lamp 107. Contacts 119 and 121 again close and a circuit is formed from the positive terminal of the current source 27 through conductor 133, contacts 121 and 119 of the relay 111, normally-closed contacts 134 and 135 of the relays 112 and 113, respectively, conductor 71, winding 62, and conductors 72, 45 and 46, back to the negative terminal 30 of the current source 27. Thus, the winding 62 is energized lifting the target 64 into the window 66 and advising the pilot or other person in charge that all occupied seat belts are fastened, and all passengers are secure. A similar operation takes place in response to operation of the remaining seat belt switches and relays.

Individual passenger warning buzzers 76 may also be employed as in the system of FIG. 1. These may be connected in parallel with the respective lamps 107, 108 and 109 for the corresponding seats; for example, in the case of the seat for lamp 107, when the seat is occupied without the seat belt being fastened a circuit is formed from the positive terminal of the current source 27 through the system energizing switch 31, the input terminal 29, conductor 122, switch contacts 104 and conductor 123, switch contacts 101 which are now closed, conductor 124, winding 114, and conductors 125 and 126 to terminal 30 of the current source 27, which energizes the winding 114. Upon closure of the contacts 117 and 118, a circuit through the buzzer 76 is formed from the positive terminal of the current source 27 through the switch 31, terminal 29, conductor 127, conductor 136, buzzer 76, conductor 137, conductor 131, contacts 118 and 117, and conductors 132, 125 and 126, back to the negative terminal 30 of the current source 27. The buzzer 76 accordingly sounds and warns the passenger to fasten his seat belt.

While the foregoing specification illustrates and describes what we now contemplate to be the best modes of carrying out our invention, the constructions are, of course, subject to modification without departing from the spirit and scope of our invention. Therefore, we do not desire to restrict the invention to the particular forms of construction illustrated and described, but desire to cover all modifications that may fall within the scope of the appended claims.

Having thus described the invention, what is claimed and desired to be secured by Letters Patent is:

1. In an indicating system for a vehicle having a plurality of passenger seats with a seat belt having a buckle and connected to each seat, the combination of:
a seat switch mounted in each seat for actuation by occupation of the seat, said seat switch having a vacant condition and an occupied condition;
a buckle switch mounted in each seat belt for actuation by buckling of the belt, said buckle switch having a buckled condition and an open condition;
an indicator for each seat for giving a secure indication when the seat is vacant and also when the seat is occupied and the belt is buckled, and giving a nonsecured indication when the seat is occupied and the belt is open;
an electric power source;
and electric circuit means for connecting the seat switch and buckle switch of a seat between said power source and the indicator of such seat for generating a secure indication when the seat switch is in the vacant condition and also when the buckle switch is in the buckled condition and generating a nonsecured indication when the seat switch is in the occupied condition and the buckle switch is in the open condition.

2. In an indicating system for a vehicle having a plurality of passenger seats with a seat belt having a buckle and connected to each seat, the combination of:
a seat switch mounted in each seat for actuation by occupation of the seat, said seat switch having an open circuit vacant condition and a closed circuit occupied condition;
a buckle switch mounted in each seat belt for actuation by buckling of the belt, said buckle switch having an open circuit buckled condition and a closed circuit open condition;
an indicator for each seat for giving a secure indication when the seat is vacant and also when the seat is occupied and the belt is buckled, and giving a nonsecured indication when the seat is occupied and the belt is open;
an electric power source;
and electric circuit means for connecting the seat switch and buckle switch of a seat in series between said power source and the indicator of such seat for generating a secure indication when the seat switch is in the vacant condition and also when the buckle switch is in the buckled condition and generating a nonsecured indication when the seat switch is in the occupied condition and the buckle switch is in the open condition.

3. In an indicating system for a vehicle having a plurality of passenger seats with a seat belt having a buckle and connected to each seat, the combination of:
a seat switch mounted in each seat for actuation by occupation of the seat, said seat switch having a vacant condition and an occupied condition and corresponding vacant and occupied terminals;
a buckle switch mounted in each seat belt for actuation by buckling of the belt, said buckle switch having a buckled condition and an open condition and corresponding buckled and open terminals;
an indicator for each seat for giving a secure indication when the seat is vacant and also when the seat is occupied and the belt is buckled, and giving a nonsecured indication when the seat is occupied and the belt is open;
an electric power source;
and electric circuit means for connecting the seat switch vacant terminal directly between said power source and the indicator of such seat for generating a secure indication when the seat switch is in the vacant condition, and for connecting the seat switch occupied terminal and the buckle switch buckled terminal in series between said power source and the indicator of such seat for generating a secure indication when the seat switch is in the occupied condition and the buckle switch is in the buckled condition.

4. In an indicating system for a vehicle having a plurality of passenger seats with a seat belt having a buckle and connected to each seat, the combination of:
a seat switch mounted in each seat for actuation by occupation of the seat, said seat switch having a vacant condition and an occupied condition;
a buckle switch mounted in each seat belt for actuation by buckling of the belt, said buckle switch having a buckled condition and an open condition;
an indicator for each seat for giving a secure indication when the seat is vacant and also when the seat is occupied and the belt is buckled, and giving a nonsecured indication when the seat is occupied and the belt is open;
an electric power source;
a secure switch for each seat, said secure switch having an open circuit condition and a closed circuit condition;
electric circuit means for connecting the secure switch of the system in series between said power source and a system secure indicator;
electric circuit means for connecting the seat switch and buckle switch of a seat between said power source and the indicator of such seat for generating a secure indication when the seat switch is in the vacant condition and also when the buckle switch is in the buckled condition and generating a nonsecured indication when the seat switch is in the occupied condition and the buckle switch is in the open condition;

and means for closing the secure switch of a seat both when the seat is vacant and when the seat belt is buckled.

5. In an indicating system for a vehicle having a plurality of passenger seats with a seat belt having a buckle and connected to each seat, the combination of:

a seat switch mounted in each seat for actuation by occupation of the seat, said seat switch having a vacant condition and an occupied condition;

a buckle switch mounted in each seat belt for actuation by buckling of the belt, said buckle switch having a buckled condition and an open condition;

an indicator for each seat for giving a secure indication when the seat is vacant and also when the seat is occupied and the belt is buckled, and giving a nonsecured indication when the seat is occupied and the belt is open;

an electric power source;

a secure relay connected in parallel with each of said indicators for actuation from said power source, each of said relays including a normally open contact pair;

a system secure indicator for giving a secure indication when all of said seat indicators are giving secure indications;

electric circuit means for connecting the seat switch and buckle switch of a seat between said power source and the indicator of such seat for generating a secure indication when the seat switch is in the vacant condition and also when the buckle switch is in the buckled condition and generating a nonsecured indication when the seat switch is in the occupied condition and the buckle switch is in the open condition;

and electric circuit means for connecting said relay contact pairs in series between said power source and said system indicator.

6. In an indicating system for a vehicle having a plurality of passenger seats with a seat belt having a buckle and connected to each seat, the combination of:

a seat switch mounted in each seat for actuation by occupation of the seat, said seat switch having a vacant condition and an occupied condition;

a buckle switch mounted in each seat belt for actuation by buckling of the belt, said buckle switch having a buckled condition and an open condition;

an indicator for each seat for giving a secure indication when the seat is vacant and also when the seat is occupied and the belt is buckled, and giving a nonsecured indication when the seat is occupied and the belt is open;

an electric power source;

a system secure indicator for giving a secure indication when all of said seat indicators are giving secure indications;

a relay for each seat, said relay having a first contact pair and a second contact pair, with the first contact pair connected in circuit with the seat indicator in controlling relation and with the second contact pairs of all the relays connected in series with said system indicator in controlling relation;

and electric circuit means for connecting the seat switch and buckle switch of a seat in series between said power source and the relay of such seat for generating a seat secure indication when the seat switch is in the vacant condition and also when the buckle switch is in the buckled condition, and generating a seat nonsecured indication when the seat switch is in the occupied condition and the buckle switch is in the open condition, and generating a system secure indication when all of the seat indicators indicate secure.

7. In an indicating system for a vehicle having a plurality of passenger seats with a seat belt having a buckle and connected to each seat, the combination of:

a seat switch mounted in each seat for actuation by occupation of the seat, said seat switch having a vacant condition and an occupied condition;

a buckle switch mounted in each seat belt for actuation by buckling of the belt, said buckle switch having a buckled condition and an open condition;

a lamp mounting panel;

an indicator lamp for each seat for giving a secure indication when the seat is vacant and also when the seat is occupied and the belt is buckled, and giving a nonsecured indication when the seat is occupied and the belt is open, with said lamps mounted in said panel;

an electric power source;

and electric circuit means for connecting the seat switch and buckle switch of a seat between said power source and the indicator of such seat for generating a secure indication when the seat switch is in the vacant condition and also when the buckle switch is in the buckled condition and generating a nonsecured indication when the seat switch is in the occupied condition and the buckle switch is in the open condition.

8. In an indicating system for a vehicle having a plurality of passenger seats with a seat belt having a buckle and connected to each seat, the combination of:

a seat switch mounted in each seat for actuation by occupation of the seat, said seat switch having a vacant condition and an occupied condition;

a buckle switch mounted in each seat belt for actuation by buckling of the belt, said buckle switch having a buckled condition and an open condition;

an indicator for each seat for giving a secure indication when the seat is vacant and also when the seat is occupied and the belt is buckled, and giving a nonsecured indication when the seat is occupied and the belt is open;

an electric power source;

and electric circuit means for connecting the seat switch and buckle switch of a seat between said power source and the indicator of such seat for generating a nonsecured indication when only the seat switch is actuated and generating a secure indication when the buckle switch is actuated.

References Cited in the file of this patent

UNITED STATES PATENTS

| | | |
|---|---|---|
| 2,453,838 | Fletcher et al. | Nov. 16, 1948 |
| 2,510,115 | Jakosky | June 6, 1950 |
| 2,802,073 | Simon | Aug. 6, 1957 |
| 2,824,293 | Meinhardt | Feb. 18, 1958 |
| 2,824,296 | Hecht et al. | Feb. 18, 1958 |